United States Patent
Chang et al.

(10) Patent No.: US 8,720,635 B2
(45) Date of Patent: May 13, 2014

(54) VEHICLE HAVING TWO GENERATORS

(75) Inventors: Chi-Han Chang, Kaohsiung (TW);
Chao-Chang Ho, Kaohsiung (TW);
Chine-Hong Lai, Kaohsiung (TW)

(73) Assignee: Kwang Yang Motor Co., Ltd.,
Kaohsiung (TW)

( * ) Notice: Subject to any disclaimer, the term of this patent is extended or adjusted under 35 U.S.C. 154(b) by 336 days.

(21) Appl. No.: 13/182,062

(22) Filed: Jul. 13, 2011

(65) Prior Publication Data
US 2012/0175887 A1   Jul. 12, 2012

(30) Foreign Application Priority Data

Jul. 14, 2010 (TW) .............................. 99123147 A

(51) Int. Cl.
*B60K 28/08* (2006.01)
*B60K 8/00* (2006.01)
*B60K 17/28* (2006.01)
*H02K 7/20* (2006.01)

(52) U.S. Cl.
USPC ........ 180/292; 180/54.1; 180/53.1; 180/53.8; 180/293; 310/112

(58) Field of Classification Search
USPC ................... 180/65.21, 65.22, 65.225, 65.23, 180/65.245, 65.27, 65.275, 65.285, 54.1, 180/291, 292, 293, 297, 53.1, 53.8, 65.31; 310/112, 75 R, 78; 123/198 R; 477/5; 192/70.23, 70.24, 93 R; 290/1 R, 1 A, 290/40 B, 40 C, 40 F; 307/9.1, 10.1
See application file for complete search history.

(56) References Cited

U.S. PATENT DOCUMENTS

| | | | | |
|---|---|---|---|---|
| 2,962,873 A | * | 12/1960 | Anderson | 62/180 |
| 4,489,242 A | * | 12/1984 | Worst | 307/10.1 |
| 4,935,689 A | * | 6/1990 | Fujikawa et al. | 307/84 |
| 5,635,805 A | * | 6/1997 | Ibaraki et al. | 318/139 |
| 5,818,115 A | * | 10/1998 | Nagao | 290/31 |
| 6,059,059 A | * | 5/2000 | Schmidt-Brucken | 180/65.23 |
| 6,570,265 B1 | * | 5/2003 | Shiraishi et al. | 290/40 C |
| 6,692,405 B2 | * | 2/2004 | Minowa et al. | 477/5 |
| 6,724,100 B1 | * | 4/2004 | Gabriel | 307/9.1 |
| 6,736,227 B2 | * | 5/2004 | Huang et al. | 180/65.25 |
| 6,740,002 B1 | * | 5/2004 | Stridsberg | 477/14 |
| 6,820,576 B2 | | 11/2004 | Kishibata et al. | |
| 7,057,303 B2 | * | 6/2006 | Storm et al. | 180/65.245 |
| 7,223,200 B2 | * | 5/2007 | Kojima et al. | 477/3 |
| 7,301,245 B2 | * | 11/2007 | Sugiura et al. | 180/65.29 |
| 7,315,090 B2 | * | 1/2008 | Yang | 290/40 C |
| 7,779,977 B2 | * | 8/2010 | Chen et al. | 192/3.56 |

* cited by examiner

*Primary Examiner* — J. Allen Shriver, II
*Assistant Examiner* — James M Dolak
(74) *Attorney, Agent, or Firm* — John A. Fortkort; Fortkort & Houston P.C.

(57) ABSTRACT

A vehicle includes an engine having a crankshaft, a charging generator disposed on the crankshaft, a power-supplying generator driven by the engine and including a rotating shaft misaligned from the crankshaft, and a vehicle power generating apparatus. The power generating apparatus includes a clutch unit and a driving unit. The clutch unit includes a clutch disposed on the crankshaft, a driving gear disposed on the clutch, and a switching mechanism operable for driving the clutch. The motion transmitting unit includes a driven gear meshing with the driving gear, and an input shaft driven by the driven gear and connected to and co-rotatable with the rotating shaft of the power-supplying generator.

7 Claims, 3 Drawing Sheets

VEHICLE HAVING TWO GENERATORS

CROSS-REFERENCE TO RELATED APPLICATION

This application claims priority of Taiwanese Application No. 099123147, filed on Jul. 14, 2010.

FIELD OF THE INVENTION

This invention relates to a vehicle, and more particularly to a vehicle having two generators.

BACKGROUND OF THE INVENTION

U.S. Pat. No. 6,820,576 discloses a vehicle including an engine and a generator disposed outwardly of the engine and driven by the engine. The generator includes a rotating shaft aligned with a crankshaft of the engine, thereby resulting in an increase in the width of the vehicle in a left-to-right direction and a reduction in the strength of the crankshaft or the rotating shaft. Furthermore, since the generator supplies electricity to electrical appliances in the vehicle only during idle running of the engine, fuel will be consumed seriously.

SUMMARY OF THE INVENTION

The object of this invention is to provide a vehicle that includes an engine and a generator driven by the engine and connected to the engine in such a manner that the width of the vehicle does not need to be increased.

Accordingly, a vehicle of this invention includes an engine having a crankshaft, a charging generator disposed on said crankshaft, a power-supplying generator driven by said engine and including a rotating shaft misaligned from said crankshaft, and a vehicle power generating apparatus. The power generating apparatus includes a clutch unit and a driving unit. The clutch unit includes a clutch disposed on said crankshaft, a driving gear disposed on said clutch, and a switching mechanism operable for driving said clutch. The motion transmitting unit includes a driven gear meshing with said driving gear, and an input shaft driven by said driven gear and connected to and co-rotatable with said rotating shaft of said power-supplying generator.

Since the rotating shaft of the power-supplying generator is misaligned from the crankshaft of the engine, it is unnecessary to increase the width of the vehicle.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
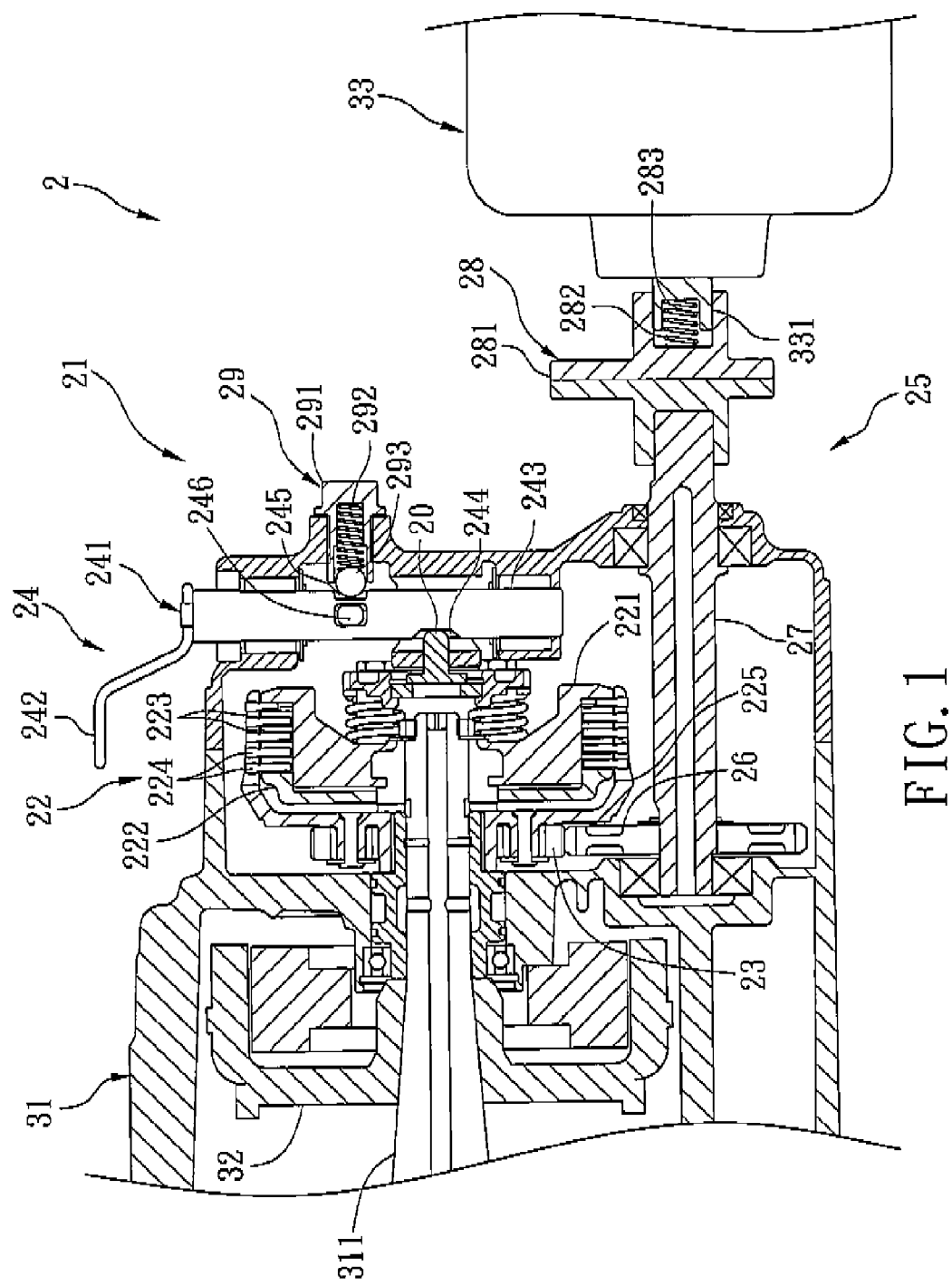
FIG. 1 is a fragmentary sectional view of the preferred embodiment of a vehicle according to this invention, illustrating a disengaging state of a clutch.

Referring to FIG. 1, the preferred embodiment of a vehicle according to this invention includes an engine 31 having a crankshaft 311, a charging generator 32 disposed on the crankshaft 311, a power-supplying generator 33 driven by the engine 31, and a vehicle power generating apparatus 2. The charging generator 32 is disposed for supplying electricity to a battery unit (not shown) of the vehicle. The power-supplying generator 33 has a rotating shaft 331 that is misaligned from the crankshaft 311.

The vehicle power generating apparatus 2 includes a clutch unit 21 and a motion transmitting unit 25.

The clutch unit 21 includes a clutch 22 disposed on the crankshaft 311, a driving gear 23 disposed on the clutch 22, a switching mechanism 24 for driving the clutch 22, a pushing member 20 driven by the switching mechanism 24, and a positioning mechanism 29 for positioning the switching mechanism 24 relative to the engine 31.

The motion transmitting unit 25 includes a driven gear 26 meshing with the driving gear 23, an input shaft 27 driven by the driven gear 26, and a shaft coupler 28 for interconnecting the input shaft 27 and the rotating shaft 331 of the power-supplying generator 33.

The clutch 22 includes a clutch seat 221 sleeved fixedly on the crankshaft 311, a pressure disk 222 sleeved movably on the crankshaft 311, a plurality of spaced-apart clutch plates 223 disposed on the clutch seat 221, a plurality of spaced-apart friction plates 224 disposed on the pressure disk 222, and a clutch disk 225 disposed around the clutch seat 221 and the pressure disk 222. The driving gear 23 is disposed fixedly on the clutch disk 225. Since the structure and operation of the clutch 22 are well known in the art, further description thereof will be omitted herein.

Figure 2:
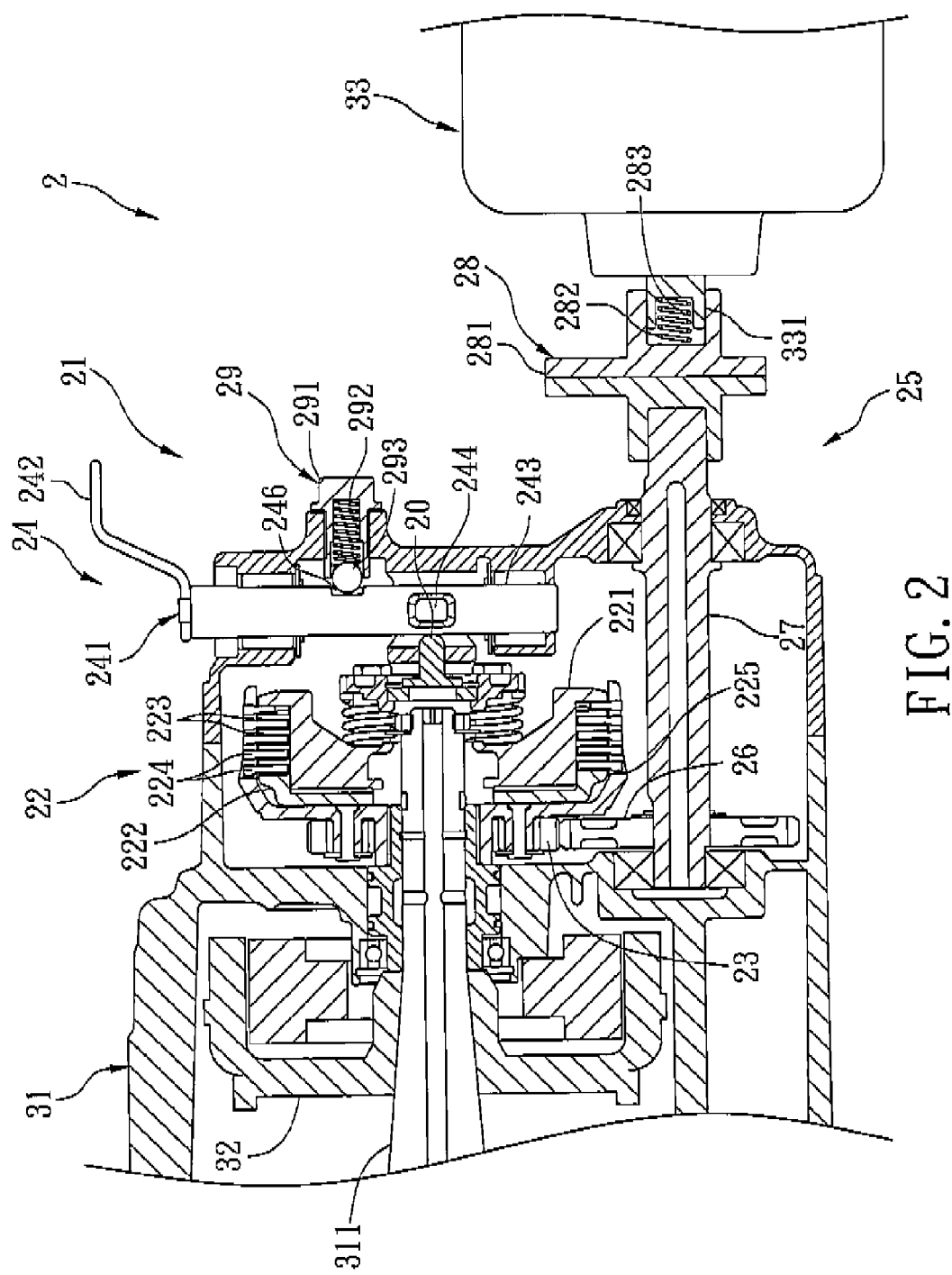
FIG. 2 is a view similar to FIG. 1 but illustrating an engaging state of the clutch.
Figure 3:
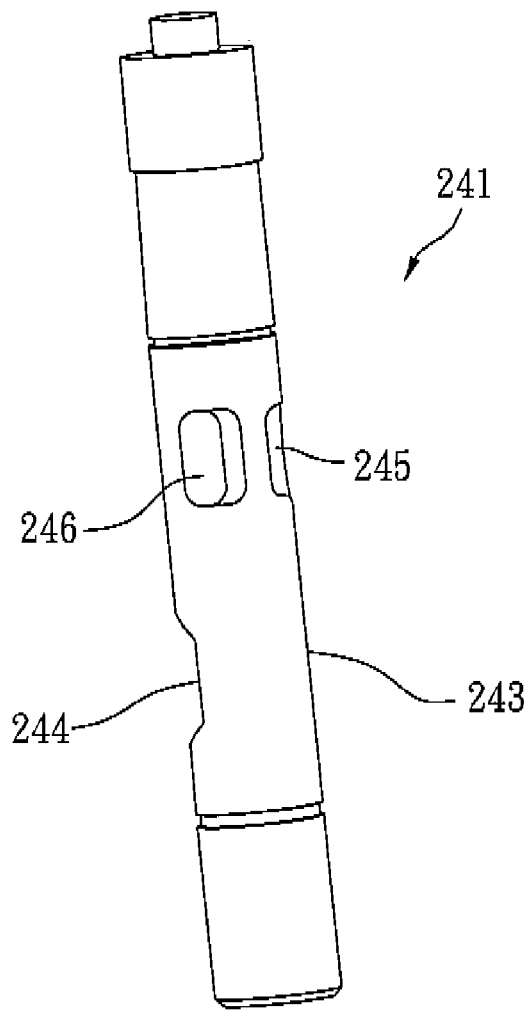
FIG. 3 is a perspective view of a switching shaft of the preferred embodiment.

With further reference to FIGS. 2 and 3, the switching mechanism 24 includes a switching shaft 241 extending into the engine 31 and rotatable about a central axis thereof, and an actuator member 242 connected fixedly to an end of the switching shaft 241 and outwardly of the engine 31. The positioning unit 29 includes a positioning seat 291 disposed on the engine 31, a positioning spring 292 disposed within the positioning seat 291, and a positioning ball 293 disposed within the positioning seat 291 and biased by the positioning spring 292 to project outwardly from the positioning seat 291.

The switching shaft 241 has a shaft body 243 rotatable relative to the engine 31, a recess 244 formed in an annular outer surface of the shaft body 243 and aligned with the pushing member 20, and a pair of first and second grooves 245, 246 formed in the annular outer surface of the shaft body 243 and arranged along a circumferential direction of the shaft body 243. The positioning ball 293 can be biased by the positioning spring 292 to engage a selected one of the first and second grooves 245, 246 for positioning the switching shaft 241 relative to the engine 31.

The shaft coupler 28 includes a sleeve 281 having two internally splined ends engaging externally splined ends of the input shaft 27 and the rotating shaft 331 of the power-supplying generator 33, respectively, and a biasing spring 282 disposed within the sleeve 281. The biasing spring 282 has two ends received respectively within the sleeve 281 and a blind hole 283 in an end surface of the rotating shaft 331.

It should be noted that, in an alternative arrangement, the biasing member 282 is disposed between the sleeve 281 and the input shaft 27, and the blind hole 283 is formed in the input shaft 27.

During running of the engine 31, the actuator member 242 can be operated to rotate the switching shaft 241 relative to the engine 31 to thereby convert the clutch 22 between a disengaging state shown in FIG. 1 and an engaging state shown in FIG. 2.

When the clutch 22 is in the disengaging state, the positioning ball 293 engages the first groove 245 in the switching shaft 241, and the pushing member 20 engages the recess 244, so that the friction plates 224 are spaced apart from the clutch plates 223 by a very small distance, respectively, thereby preventing rotation of the clutch disk 225.

When the clutch 22 is in the engaging state, an electrical throttle valve (not shown) is operated to maintain the crankshaft 311 at a preset rotational speed, the positioning ball 293 engages the second groove 246 in the switching shaft 241, and the pushing member 20 is disengaged from the recess 244 in the switching shaft 241, so that the friction plates 224 are pressed against the clutch plates 223, respectively, thereby allowing for co-rotation of the clutch disk 225 with the crankshaft 311. Hence, rotation is transferred from the crankshaft 311 to the input shaft 27 and the rotating shaft 331 of the power-supplying generator 33 due to meshing of the driving gear 23 with the driven gear 26. At this time, the power-supplying generator 33 can supply electricity to external electrical appliances, e.g., used for camping.

Preferably, the preset speed of the crankshaft 311 is greater than 3600 rpm. Since the electrical throttle valve is known in the art, further description thereof will be omitted herein.

The vehicle of this invention has the following advantages:

Since the rotating shaft 331 of the power-supplying generator 33 is misaligned from the crankshaft 311 of the engine, the width of the vehicle is reduced effectively, and the structural strength of the rotating shaft 331 and the crankshaft 311 is increased.

To drive the power-supplying generator 33, it is necessary to control the engine 31 to run idly. Through operation of the electrical throttle valve, during idle running of the engine 31 and when the clutch 22 is operated in the engaging state, the crankshaft 311 is maintained at the preset rotational speed to rotate the rotating shaft 331 smoothly so as to generate sufficient electric energy from the power-supplying generator 33 and reduce consumption of fuel.

The rotational speed of the input shaft 27 can be changed by adjusting tooth number ratio of the driving gear 23 and the driven gear 26 to conform to a different type of the power-supplying generator 33.

The actuator member 242 is operable to allow power to be transmitted from the crankshaft 311 to the power-supplying generator 33. As such, the controllability of the vehicle power generating apparatus 2 is high.

The input shaft 27 is connected to the rotating shaft 331 by the shaft coupler 28 so as to smooth rotation of the input shaft 27 and the rotating shaft 331.

Due to presence the biasing spring 282, a clearance between the input shaft 27 and the sleeve 281 is eliminated to reduce noise generated during rotation of the input shaft 27 and the rotating shaft 331.

With this invention thus explained, it is apparent that numerous modifications and variations can be made without departing from the scope and spirit of this invention. It is therefore intended that this invention be limited only as indicated by the appended claims.

We claim:

1. A vehicle comprising:
    an engine having a crankshaft;
    a charging generator disposed on said crankshaft;
    a power-supplying generator driven by said engine and including a rotating shaft misaligned from said crankshaft; and
    a vehicle power generating apparatus including a clutch unit including
        a clutch disposed on said crankshaft, a driving gear disposed on said clutch, and a switching mechanism operable for driving said clutch, and
    a motion transmitting unit including a driven gear meshing with said driving gear, and an input shaft driven by said driven gear and connected to and co-rotatable with said rotating shaft of said power-supplying generator;
    wherein said motion transmitting unit further includes a shaft coupler for interconnecting said input shaft and said rotating shaft;
    wherein each of said input shaft and said rotating shaft has an externally splined end, and said shaft coupler includes a sleeve having two internally splined ends engaging respectively said externally splined ends of said input shaft and said rotating shaft, and a biasing spring disposed between and abutting against said sleeve and one of said input shaft and said rotating shaft for biasing said sleeve and said one of said input shaft and said rotating shaft away from each other.

2. The vehicle as claimed in claim 1, wherein one of said input shaft and said rotating shaft has an end surface formed with a blind hole for receiving an end of said biasing spring.

3. A vehicle comprising:
    an engine having a crankshaft;
    a charging generator disposed on said crankshaft;
    a power-supplying generator driven by said engine and including a rotating shaft misaligned from said crankshaft; and
    a vehicle power generating apparatus including
    a clutch unit including a clutch disposed on said crankshaft, a driving gear disposed on said clutch, and a switching mechanism operable for driving said clutch, and
    a motion transmitting unit including a driven gear meshing with said driving gear, and an input shaft driven by said driven gear and connected to and co-rotatable with said rotating shaft of said power-supplying generator;
    wherein said switching mechanism includes a switching shaft extending into said engine and rotatable relative to said engine about a central axis of said switching shaft, and an actuator member connected fixedly to said switching shaft and disposed outwardly of said engine for manual operation.

4. A vehicle comprising:
    an engine having a crankshaft;
    a charging generator disposed on said crankshaft;
    a power-supplying generator driven by said engine and including a rotating shaft misaligned from said crankshaft; and
    a vehicle power generating apparatus including
    a clutch unit including a clutch disposed on said crankshaft, a driving gear disposed on said clutch, and a switching mechanism operable for driving said clutch, and
    a motion transmitting unit including a driven gear meshing with said driving gear, and an input shaft driven by said driven gear and connected to and co-rotatable with said rotating shaft of said power-supplying generator;
    wherein said clutch unit further includes a one-piece pushing member movable by said switching mechanism to activate said clutch, so as to allow said power-supplying generator to supply electricity to external electrical appliances.

5. The vehicle as claimed in claim 4, wherein said switching mechanism includes a switching shaft extending into said engine and rotatable relative to said engine about a central axis of said switching shaft, and an actuator member connected fixedly to said switching shaft and disposed outwardly of said engine for manual operation, said vehicle further comprising a positioning mechanism, said switching shaft has a shaft body rotatable relative to said engine and having an annular outer surface, a recess formed in said annular outer surface of said shaft body and aligned with said pushing member, and a pair of first and second grooves formed in said annular outer surface of said shaft body and arranged along a circumferential direction of said shaft body said positioning mechanism including a positioning seat disposed on said engine, a positioning spring disposed within said positioning seat, and a positioning ball disposed within said positioning seat and biased by said positioning spring to project outwardly from said positing seat into a selected one of said first and second grooves.

6. The vehicle as claimed in claim 5, wherein said clutch includes a clutch seat sleeved fixedly on said crankshaft, a pressure disk sleeved movably on said crankshaft, a plurality of clutch plates disposed on said clutch seat, a plurality of friction plates disposed on said pressure disk, and a clutch disk disposed around said clutch seat and said pressure disk, said driving gear being disposed fixedly on said clutch disk, said actuator member being operable to rotate said switching shaft to thereby move said pressure disk relative to said clutch seat, so as to convert said clutch between a disengaging state and an engaging state such that, when said clutch is in said disengaging state, said positioning ball engages said first groove in said switching shaft, and said pushing member engages said recess in said switching shaft, so that said friction plates are spaced apart from said clutch plates respectively, thereby preventing rotation of said clutch disk, and when said clutch is in said engaging state, said crankshaft is controlled to rotate at a preset rotational speed, said positioning ball engages said second groove in said switching shaft, and said pushing member is disengaged from said recess in said switching shaft, so that said friction plates are pressed against said clutch plates, respectively, thereby allowing for co-rotation of said clutch disk with said crankshaft, which results in rotation of said input shaft and said rotating shaft of said power-supplying generator due to meshing of said driving gear with said driven gear.

7. The vehicle as claimed in claim 6, wherein said preset rotational speed is greater than 3600 rpm.

* * * * *